United States Patent
Ding et al.

(10) Patent No.: US 12,442,551 B1
(45) Date of Patent: Oct. 14, 2025

(54) FAULT DETECTION METHOD FOR REFRIGERATION UNITS BASED ON IMPROVED DEEP LEARNING MODEL

(71) Applicant: HANGZHOU DIANZI UNIVERSITY, Hangzhou (CN)

(72) Inventors: Qiang Ding, Hangzhou (CN); Qixing Zeng, Hangzhou (CN); Chong Shi, Hangzhou (CN); Shuang Liu, Hangzhou (CN); Dechuan Chen, Hangzhou (CN)

(73) Assignee: HANGZHOU DIANZI UNIVERSITY, Hangzhou (CN)

( * ) Notice: Subject to any disclaimer, the term of this patent is extended or adjusted under 35 U.S.C. 154(b) by 0 days.

(21) Appl. No.: 19/052,538

(22) Filed: Feb. 13, 2025

Related U.S. Application Data

(63) Continuation of application No. PCT/CN2024/096482, filed on May 30, 2024.

(51) Int. Cl.
*F24F 11/38* (2018.01)
*F24F 11/46* (2018.01)
(Continued)

(52) U.S. Cl.
CPC ............. *F24F 11/38* (2018.01); *F24F 11/46* (2018.01); *F24F 11/64* (2018.01); *G06N 3/0464* (2023.01); *G06N 3/082* (2013.01)

(58) Field of Classification Search
CPC . F24F 11/38; F24F 11/64; F24F 11/46; G06N 3/0464; G06N 3/082
(Continued)

(56) References Cited

U.S. PATENT DOCUMENTS 11,543,145 B2 * 1/2023 Asiwaju .................... F24F 11/30
2016/0377333 A1 * 12/2016 Bertagnolio .......... F25B 49/005 62/56

(Continued)

FOREIGN PATENT DOCUMENTS

CN 114494766 A 5/2022
CN 116010900 A 4/2023
(Continued)

OTHER PUBLICATIONS

Seabra, et al., "IoT based intelligent system for fault detection and diagnosis in domestic appliances", 2016 International conference on consumer electronic—Berlin, 2016 (Year: 2016).*
(Continued)

*Primary Examiner* — Tsu-Chang Lee
(74) *Attorney, Agent, or Firm* — Birchwood IP

(57) ABSTRACT

A fault detection method for refrigeration units based on an improved deep learning model is provided, including the following steps: S1: obtaining operating parameters of a refrigeration unit in a normal operating state and in states with different fault types as data sets; S2: detecting local outliers in the data set by using a local outlier factor algorithm and removing the local outliers, and then expanding the data set by using adaptive synthetic sampling; S3: normalizing the data set; S4: constructing a fault detection model; and S5: inputting the parameters of the tested refrigeration unit into the fault detection model, and judging whether the tested refrigeration unit has a fault and the type of the fault.

8 Claims, 10 Drawing Sheets

(51) Int. Cl.
*F24F 11/64* (2018.01)
*G06N 3/0464* (2023.01)
*G06N 3/082* (2023.01)

(58) Field of Classification Search
USPC .......................................................... 706/16
See application file for complete search history.

(56) References Cited

U.S. PATENT DOCUMENTS

2017/0213303 A1* 7/2017 Papadopoulos ....... G06F 16/248
2024/0142342 A1 5/2024 Bao

FOREIGN PATENT DOCUMENTS

| CN | 117312903 A | 12/2023 |
| CN | 118468204 B | 8/2024 |

OTHER PUBLICATIONS

Arcos, et al., "Practices of fault diagnosis in household appliances: Insights for design", Journal of Cleaner Production 265 (2020), 2020 (Year: 2020).*

Hosseini, et al., "A practical approach to residential appliances on-line anomaly detection: a case study of standard and smart refrigerators", IEEE Access, Mar. 2020 (Year: 2020).*

Anonymous. "YOLOv8 Improvement | Fusion Module | Replace Conv with Resblock+CBAM Convolution [Lightweight Network]"https://developer.aliyun.com/article/1516288, May 23, 2024 (May 23, 2024), pp. 1-4.

* cited by examiner

FAULT DETECTION METHOD FOR REFRIGERATION UNITS BASED ON IMPROVED DEEP LEARNING MODEL

CROSS-REFERENCE TO RELATED APPLICATIONS

This application is a continuation of PCT/CN2024/096482, filed on May 30, 2024 and claims priorities to Chinese Patent Application No. 202410656109.4, filed on May 24, 2024, the contents of which are hereby incorporated by reference.

TECHNICAL FIELD

The present disclosure relates to fault diagnosis of refrigeration units, and specifically relates to a fault detection method for refrigeration units based on an improved deep learning model.

BACKGROUND

Building energy consumption is a hot issue in today's social development, in which the refrigeration unit is an important part of the air-conditioning energy consumption. Relevant research shows that the refrigeration unit's operational energy consumption accounts for about 30-40% of the building energy consumption, and when the unit is in a faulty operating state, the energy consumption of the equipment will increase by about 15-30%. Timely troubleshooting of the refrigeration unit is of great significance to improve energy utilization.

Machine learning has been successfully used in the early fault diagnosis of refrigeration units, and in recent years, methods based on deep learning have been rapidly developed in the field of refrigeration unit fault diagnosis. On the one hand, deep learning achieves high fault diagnosis accuracy by learning the complex nonlinear features of time series data. For example, Han uses deep neural network (DNN) to learn the nonlinear features of fault data, and the model has efficient and stable performance, which improves the fault diagnosis accuracy. On the other hand, deep learning has the ability to extract deep features through the combination of multi-layer neural networks. Long Short-Term Memory (LSTM) networks have advantages in dealing with high-dimensional, strongly coupled, and highly time-varying data, and He et al. successfully used a combination of multi-layer LSTMs in the field of fault diagnosis of refrigeration units to extract the fault data features in depth.

However, in the actual training deep learning model, with the increase of network layers, the problems of gradient disappearance and network degradation are easy to occur, which leads to negative effects such as network training difficulty and performance degradation. In order to solve the above problems, Glorot X and others put forward Xavier initialization parameter improvement strategy, which improved the performance and convergence speed of the network in the deep structure. Later, Ioffe S and others put forward batch normalization (BN), which is helpful to restrain the internal covariant deviation and alleviate the network degradation problem.

The emergence of residual neural network (ResNet) has made great progress in solving the above problems, ResNet model effectively solves the network degradation problem through residual connection, and focuses more on improving the gradient flow and avoiding the loss of information in the deeper network compared to Xavier initialization parameter and BN technique, and has the ability to deeply mine the data features. For example, Liu Feitian et al. used ResNet_21 for centrifugal refrigeration unit fault diagnosis, which improved over CNN in refrigerant leakage faults. However, the ResNet_21 model has a deeper number of layers and contains 21 convolutional layers, which leads to poor training efficiency and overfitting problems, and still has more misjudgments and omissions in the refrigerant overload fault state, which is considered to be the reason that the model in this thesis focuses on deepening the number of layers of the network and ignores the impact of the key features of the fault on the fault diagnosis results.

In the field of fault diagnosis, fault diagnosis should emphasize the importance of key features for fault identification, deep learning that lacks an attention mechanism usually employs fixed weights to process the features of each element in the sequence. Research has shown that the introduction of an attention mechanism may strengthen the degree of attention to key features, and the mechanism is in the stage of continuous development. The Convolutional Block Attention Module (CBAM) improves the fault diagnosis performance of the model on refrigeration unit timing data by capturing key features more comprehensively through channel attention and spatial attention mechanisms.

Therefore, the present disclosure takes the above problems into account and aims to utilize the shallower ResNet model as the research basis, with each residual block containing two convolutional layers. ResNet may deeply mine data features and alleviate the degradation problem that is prone to occur during deep neural network training. Combining the perception ability of CBAM on key features, the advantages of both are combined to achieve high fault recognition rate while reducing the complexity of existing models. A ResNet CBAM refrigeration unit fault detection model is established.

However, in the actual engineering situation, there are some outliers in the refrigeration unit operation data, and their local distribution density is low, which causes misjudgment to the diagnostic results of the classifier, this disclosure adopts the Local Outlier Factor (LOF) algorithm to detect and eliminate the anomalies in the data set to ensure the quality of the data set.

In real engineering situations, refrigeration units usually operate in a healthy state, thus leading to a relative scarcity of fault data. Data imbalance may lead to a bias of the machine learning model towards the majority of categories in fault diagnosis, then result in a low fault detection rate, reduce the generalization performance of the model and affect the fault diagnosis results. There are quite a few existing data enhancement methods for the problem of imbalance of refrigeration unit operation data. While ADASYN has more intuitive interpretability and stability compared to GAN and VAE, it is more targeted and adaptable in dealing with category imbalance data compared to other oversampling methods such as SMOTE. After the LOF algorithm removes the anomalies (outliers) in the data set, and after expanding the data set with ADASYN, the ResNet-CBAM detection model is finally used for fault diagnosis.

After removing outliers from the data set using the LOF algorithm and expanding the data set with ADASYN, the ResNet CBM detection model is ultimately used for fault diagnosis.

SUMMARY

In order to remove some outliers in the operation data of refrigeration units in actual engineering, as well as to cope with the problem of scarcity of fault data, the present disclosure adopts the LOF-ADASYN algorithm to process the data set. Moreover, in order to improve the accuracy of the fault diagnosis of refrigeration units and to solve the problem of network degradation that easily occurs in the existing refrigeration unit fault diagnostic techniques as well as the general lack of the detection model to weight the weights of the key features, the present disclosure proposes a deep learning fault diagnosis method for refrigeration units based on LOF-ADASYN combined with ResNet-CBAM model to realize accurate faults diagnosis of refrigeration units.

On the one hand, the present disclosure provides a fault detection method for refrigeration units based on an improved deep learning model, including the following steps:

S1: obtaining operating parameters of a refrigeration unit in a normal operating state and in states with different fault types as data sets;

S2: detecting local outliers in the data set by using a local outlier factor algorithm and removing the local outliers, and then expanding the data set by using adaptive synthetic sampling;

S3: normalizing the data set;

S4: constructing a fault detection model, wherein the fault detection model includes a ResNet module and a CBAM module, the ResNet module includes three residual blocks connected in sequence, each residual block is introduced with a Dropout layer, the Dropout layer randomly closes some neurons of a 1DCNN layer connected to it at a dropout rate p, and input of the residual block and output of the Dropout layer are identity mapped and added together as output of the residual block.

Output of the ResNet module serves as input of the CBAM module; the CBAM module includes sequentially connected channel attention module and spatial attention module; in the spatial attention module, a channel attention weight output by the channel attention module are subjected to max pooling and average pooling on channels of each feature point to obtain feature maps $F_{max}^s$ and $F_{avg}^c$, respectively; and then the feature maps $F_{max}^s$ and $F_{avg}^c$ are concatenated based on the channels, and obtained features are subjected to convolution operations with three different scales; three results of the convolution operations are fuse and activated; sizes n1, n2 and n3 of convolution kernels of the convolution operations with three different scales satisfy a following constraint: n1+2=n2=n3−2, and n1, n2 and n3 are positive integers.

An output feature of the CBAM module is input to fully connected layers, and the fault detection model is trained by using the data set obtain in the S2; and S5: inputting the parameters of the tested refrigeration unit into the fault detection model, and judging whether the tested refrigeration unit has a fault and the type of the fault.

Optionally, in the ResNet module, the input of a first residual block is operating data of the refrigeration unit, and the output of a last residual block is the output of the ResNet module; the ResNet module outputs to a middle hidden layer; an output feature $h=[h_1, h_2, \ldots, h_N]$ of the hidden layer obtained by the ResNet module extracting relevant features go through the channel attention module and the spatial attention module in turn.

Optionally, an output feature Yd of the Dropout layer in the residual block is as follows:

$$Y_d = \frac{1}{1-p} \times x$$

where X is input of the Dropout layer, p is the dropout rate.

Optionally, a value of the dropout rate p is 0.2.

Optionally, the residual block includes a first 1DCNN layer, an activation function layer, a BN layer, a second 1DCNN layer, the Dropout layer and an identity mapping layer sequentially connected; input of the first 1DCNN layer and the output of the Dropout layer are input to the identity mapping layer together for superposition.

Optionally, in the channel attention module, the output features of the hidden layer output by the ResNet module are subjected to global max pooling and global average pooling operations to obtain feature maps $F_{max}^s$ and $F_{avg}^c$, respectively; the feature maps $F_{max}^s$ and $F_{avg}^c$ are both input into a multilayer perceptron to generate feature map 1 and feature map 2, respectively; in multilayer perceptron, a channel dimension of the feature maps is reduced by using channel reduction; a value of a reduction ratio r for the channel reduction is a factor of a number of the operating parameters, and r>1; the feature map 1 and the feature map 2 are concatenated through elements to obtain a new feature map; the new feature map is activated by Sigmoid function and each of the elements in the new feature map is given a new weight, and the weight is the channel attention weight $M_C(F)$.

Optionally, a feature vector Y obtained by weighting weights of the CBAM module is input to the fully connected layer; weight parameters in the fully connected layer combine input features to generate a high-dimensional global feature Z; the weight parameters are learned and updated during a training process by a back-propagation algorithm; the global feature 2 is input into output layer of the fully connected layer, the output layer uses a Softmax function, the output layer contains n neuron, wherein n is a number of states of the refrigeration unit, and n neurons are used to determine n−1 fault states and a normal state of the refrigeration unit.

Optionally, a specific process of S2 is as follows:

1) constructing an expression for a reachability distance reach_dk(b, o) for any point b in the data set:

$$\text{reach\_d}_k(b, o) = \max\{d_k(o), d(b, o)\}, \quad (1)$$

wherein point o is any neighbor point of the point b, $d_k(o)$ is a distance between the k-th neighbor point and the point o, and d(b, o) denotes Euclidean distance between the point b and the point o;

2) calculating a local reachability density $Ird_k(b)$ as follows:

$$Ird_k(b) = \frac{1}{\left(\frac{\sum_{o \in N_k(b)} \text{reach\_d}_k(b, o)}{|N_k(b)|}\right)}, \quad (2)$$

wherein $N_k(b)$ is a set of the point b and K-th near neighbor data points;

3) calculating a local outlier factor $LOF_k(b)$ of the point b:

$$LOF_k(b) = \frac{\sum_{o \in N_k(b)} \frac{Ird_k(o)}{Ird_k(b)}}{|N_k(b)|}; \quad (3)$$

4) determining a number G of samples to be generated after removing the local outlier factor $LOF_k(b)$ $$G = (m_l - m_s) * \beta, \quad (4)$$

where $m_l$ represents a number of existing majority samples, and ms represents a number of existing minority samples, $\beta \in [0,1]$.

5) calculating a ratio ri of the majority samples in the K-th near neighbor of each of the minority samples:

$$ri = \Delta i/K, \quad (5)$$

wherein $\Delta i$ is the number of the samples belonging to the majority samples among the K-th near neighbor of the L-th minority sample;

6) calculating a standardized ratio $r_i^*$ as follows:

$$r_i^* = r_i / \sum_{i=1}^{m_s} r_i, \quad (6)$$

7) calculating a number of new samples that need to be generated for each of the minority samples:

$$g_i = r_i^* * G; \quad (7)$$

8) generating $g_i$ new samples for each of the minority samples xi:

$$s_i = x_i + (x_{zi} - x_i) * \gamma \quad (8)$$

where si represents the newly generated samples, xzi is a minority sample randomly selected from the K-th neighbor of the minority samples xi, and $\gamma \in [0,1]$ is a random number.

Optionally, the identified refrigeration unit is a chiller unit; fault types of the chiller unit include one or more of excessive lubricating oil, scale formation in condensers, refrigerant leakage, excessive refrigerant, non-condensable gas, insufficient cooling water and insufficient chilled water.

Optionally, the operating parameters include one or more temperature parameters, one or more valve location parameters, one or more pressure parameters, one or more flow parameters, one or more power parameters, and one or more current parameters.

On the other hand, the disclosure provides a computer device, including a memory, a processor and a computer program stored in the memory and runnable on the processor, wherein the memory stores the computer program, and the processor executes the fault detection method for refrigeration units based on an improved deep learning model.

On another hand, the disclosure provides a readable storage medium, storing a computer program, wherein the computer program when executed by a processor is used to implement the fault detection method for refrigeration units based on an improved deep learning model.

Compared with the prior art, the disclosure has the following effects.

Firstly, the present disclosure introduces a Dropout layer in the ResNet module of the ResNet-CBAM model, the Dropout layer randomly closes some neurons of p the 1DCNN layer connected to itself at a dropout rate of p to mitigate the risk of overfitting and enhance the model generalization ability; and the present disclosure introduces a multiscale convolution in the spatial attention module to capture different receptive field features in the feature maps; based on this, the present disclosure mitigates the network degradation problem and focuses on key features extraction, and overcomes the problems of prone to network degradation and lack of weighting of key features of the fault data in the existing deep learning models for fault diagnosis of refrigeration units.

Then, the present disclosure utilizes the LOF algorithm to successfully remove the outliers in the data set to ensure the quality of the data set, and then uses Adaptive Synthetic Sampling (ADASYN) to successfully increase the samples of the fault data to achieve data enhancement, and the solves the data imbalance problem in the actual engineering.

Finally, the detection model provided by the present disclosure overcomes the characteristic that EO, RO and RL as refrigeration unit system faults have strong coupling and are difficult to identify, and realizes the identification of these three types of faults with high accuracy.

DESCRIPTION OF EMBODIMENTS

Figure 1:
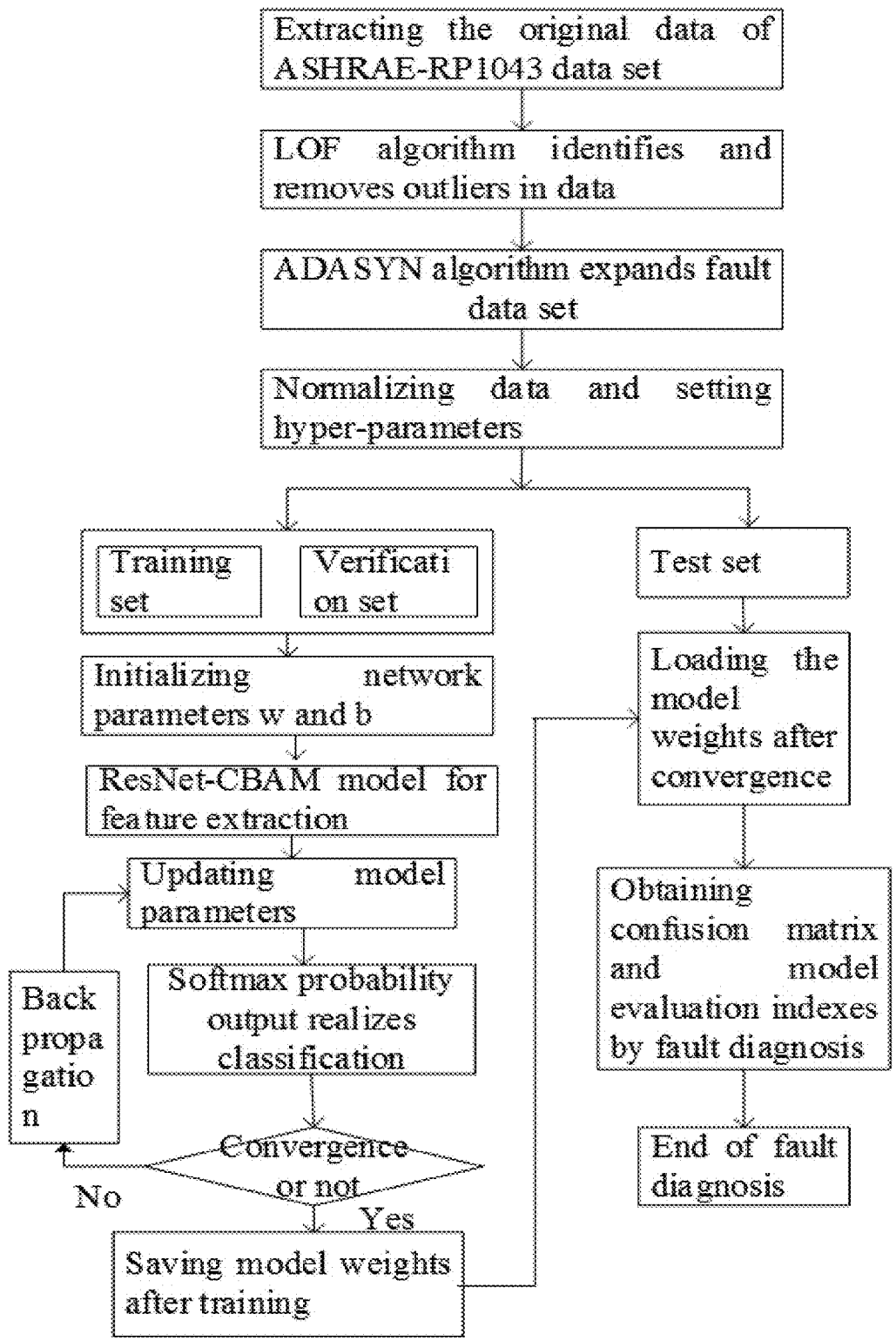
FIG. 1 shows a flowchart for fault diagnosis of refrigeration units of the present disclosure.
Figure 2:
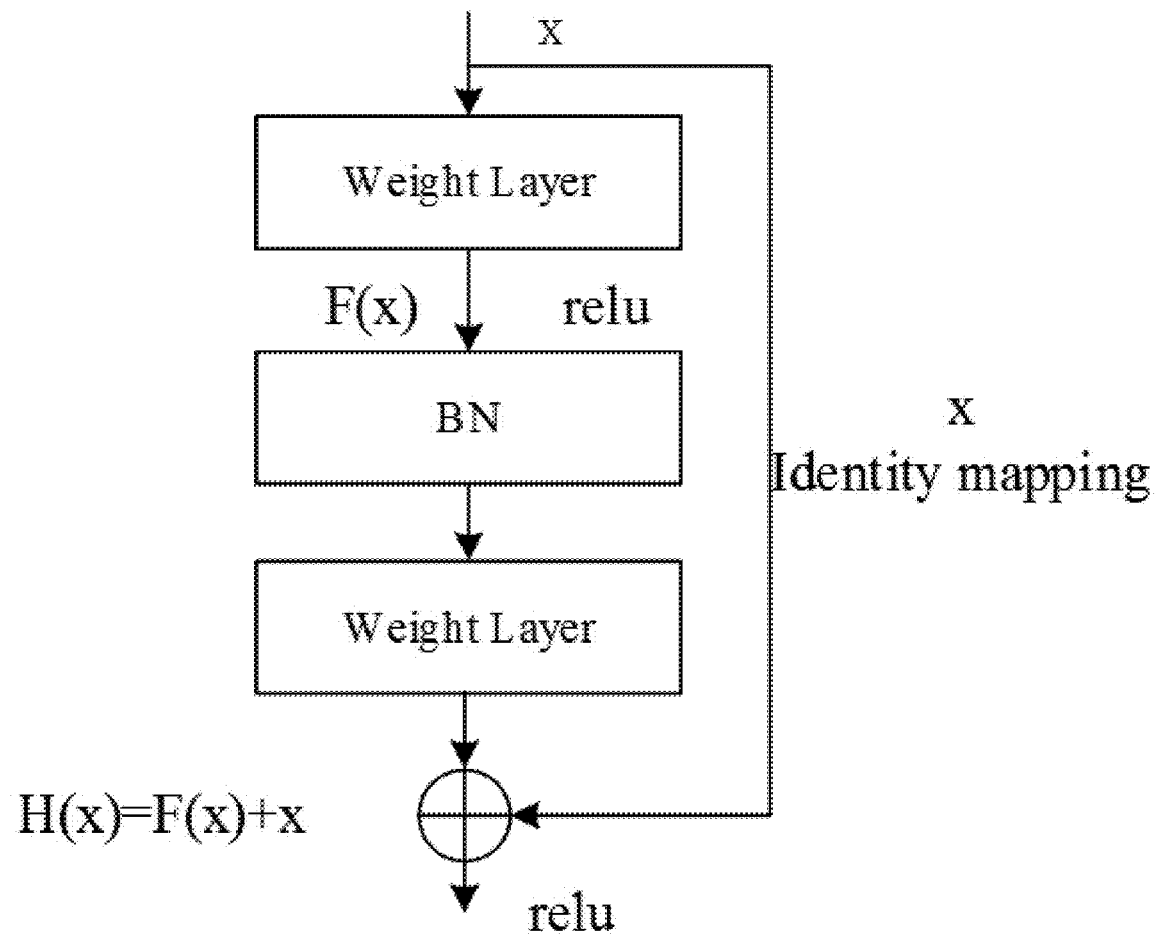
FIG. 2 shows a structural diagram of a residual block in the present disclosure.

In order to more clearly elucidate the objective, technical solutions and advantages of the refrigeration unit in the present disclosure, the present disclosure is described in more detail hereinafter in connection with specific embodiments and with reference to the drawings. The described embodiments represent only some of the embodiments of the present disclosure.

Embodiment 1

As shown in FIG. 1 to FIG. 4, a fault detection method for refrigeration units based on an improved deep learning model is based on an end-to-end fault detection model. The fault detection model is based on the Python 3.7.0 platform, and is constructed based on the Pytorch 1.13.1 deep learning framework, and is trained on a hardware device with an NVIDIA GeForce RTX 3060 Ti GPU. In this embodiment, the refrigeration unit is specifically a chiller unit; in some other embodiments, the refrigeration unit may also be an air-cooled heat pump unit or other types of refrigeration units.

The fault detection method for a refrigeration unit includes the following steps.

S1: Obtaining operating parameters of a chiller unit in a normal operating state and in states with different fault types, and forming a labeled sample set. In this embodiment, the ASHRAE RP-1043 data set is used, and is derived from the description of a chiller unit fault simulation experiment in the ASHRAE RP-1043 standard. The experiment involves a centrifugal chiller unit rated at 90 standard tons (approximately 316 kW) and uses R134a as the refrigerant. ASHRAE simulates a normal state and seven fault states under 27 operating conditions by adjusting three control variables: chilled water temperature, condenser water inlet temperature and condenser cooling load. Each fault state is tested at four different levels of failure. The simulation experiment runs for approximately 14 hours for each state with a data sampling interval of 10 seconds, where Nor represents the normal state, EO, RL and RO represent the system faults, CF, NC, FWC and FWE represent the localized faults, and the specific fault type names are shown in Table 1.

TABLE 1

ASHRAE RP-1043 SL1 Fault Types

| Fault number | Fault types | Abbreviation | Normal value | deviation |
|---|---|---|---|---|
| 1 | Excessive lubricating oil | EO | 10 kg | +14% |
| 2 | Scale formation in condensers | CF | 164 pipes | −12% |
| 3 | Refrigerant leakage | RL | 136 kg | −10% |
| 4 | Excessive refrigerant | RO | 136 kg | +10% |
| 5 | Non-condensable gas | NC | 0 kg | +0.045 kg |
| 6 | Insufficient cooling water | FWC | 17 kg/s | −10% |
| 7 | insufficient chilled water | FWE | 13.6 kg/s | +10% |

In this embodiment, the ASHRAE 1043 RP data acquisition interval is 10 seconds, and 64 parameters are recorded. Among them, 48 parameters are directly collected through sensors, including 29 temperature parameters, 7 valve position parameters, 5 pressure parameters, 2 flow parameters, 1 power parameter and 1 current parameter, and the remaining 16 parameters are calculated in real-time using VisSim software. Due to the significant changes in certain variables during the short periods of start-up and shutdown of the chiller unit, the validity of these data during data collection is low. Therefore, when selecting the data set, steady-state data is used.

Two different embodiments are arranged, corresponding to the balanced data set and the unbalanced data set, respectively.

The embodiment for the balanced data set uses seven types of fault data (see Table 1 for fault types) at the least severe fault level (SL1) and normal data as the sample set, 1,200 data pieces are selected for each state to form a sample data set ω of 9600×64 dimensional matrix, and the sample data set is randomly divided into training sets, a validation sets and a testing sets according to the ratio of 6:2:2.

The embodiment under the unbalanced data set uses 1200 pieces of normal data and 300 pieces of fault data from each kind of faults, and the experiment is carried out under the unbalanced ratio of 4:1, and the method of data set division is consistent with that of the embodiment under the balanced data set.

S2: Detecting local outliers in the data set by using a Local Outlier Factor (LOF) algorithm and eliminating the local outliers, and then expanding the data set by using Adaptive Synthetic Sampling (ADASYN).

In the embodiment of to expanding the fault data set by using LOF-ADASYN, finally, under the balanced data set, there are 1200 pieces of data under each state in the training sets and validation sets, for this purpose, 1200 pieces of data under the normal state are taken, and for each other fault state, outliers are firstly removed from the fault data set by using the LOF algorithm, and then different amounts of data are collected at different oversampling rates by using the ADASYN method (when the oversampling rate is 100%, there are originally 600 pieces of data for each fault state; when the oversampling rate is 200%, there are originally 600 pieces of data for each fault state); and finally data balance is achieved, with a total of approximately 9600 pieces of data in the training sets and validation sets, and the ratio of the training sets and the validation sets is divided to be 5:1. Additional 3000 pieces of ASHRAE RP-1043 raw data, namely 375 pieces of data for each type, are used for the testing sets to verify the generalization ability of the deep learning model.

Oversampling rate refers to the ratio of the number of synthesized samples generated by oversampling techniques to the number of original minority samples when dealing with data imbalance problems.

Expanding the fault data set by using LOF-ADASYN includes the following steps:

S201: calculating a local density of each point:

calculating the distance between point b and the K-th near neighbor point, denoted as $d_k(b)$, where $d(b, o)$ represents the Euclidean distance between point b and point o:

$$\text{reach}\_d_k(b,o) = \max\{d_k(o), d(b,o)\} \quad (1);$$

S202: calculating a Local Reachability Density (LOD) $\text{Ird}_k(b)$, where $N_k(b)$ is the set of b point and the K-th near neighbor data point:

$$\text{Ird}_k(b) = \frac{1}{\left(\frac{\sum_{o \in N_k(b)} \text{reach}\_d_k(b, o)}{|N_k(b)|}\right)} \quad (2)$$

S203: calculating the local outlier factor $LOF_k(b)$ of the point b.

$$LOF_k(b) = \frac{\sum_{o \in N_k(b)} \frac{Ird_k(o)}{Ird_k(b)}}{|N_k(b)|}; \quad (3)$$

S204: determining the number of samples to be generated after removing the local outlier factor determined in the above steps:

$$G = (m_l - m_s) * \beta, \quad (4)$$

where $m_l$ represents the number of existing majority samples, and ms represents the number of existing minority samples, $\beta \in [0,1]$; when $\beta=1$, the number of majority samples and the number of synthesized minority samples are ultimately equal; and G is the total number of samples that needed to be generated;

S205: calculating a ratio of majority samples in the K-th near neighbor point of each of the minority samples:

$$ri = \Delta i/K, \quad (5)$$

calculating the ratio $r_i$, where a numerator $\Delta i$ is the number of samples belonging to the majority samples among the K-th near neighbor point of the i-th minority sample;

S206: standardizing $r_i$:

$$r_i^* = r_i / \sum_{i=1}^{m_s} r_i, \quad (6)$$

S207: calculating a number of new samples that need to be generated for each minority sample:

$$g_i = r_i^* * G; \quad (7)$$

S208: generating $g_i$ new samples for each minority sample xi:

$$s_i = x_i + (x_{zi} - x_i) * \gamma, \quad (8)$$

where si represents newly generated samples, xzi is a minority sample randomly selected from the K-th near neighbor point of xi, and $\gamma \in [0,1]$ is a random number.

S3: Normalizing the sample data set w using a Min-Max normalization technique to ensure that the result values are mapped between [0-1], as follows:

dividing the sample set processed in S2 into training sample sets $w_{train}$, testing sample sets $w_{test}$, and validation sample sets $w_{val}$ in proportion, and normalizing the sample data set w by using the Min-Max normalization technique to ensure that the output values are mapped between [0-1], where a formula for Min-Max normalization technique is as follows:

$$x' = \frac{x - \min}{\max - \min}, \quad (9)$$

where x and x' are the data before and after normalization, respectively, min and max are the maximum and the minimum values in the data, respectively.

S4: Constructing and training the ResNet CBM model.

The selection of parameters in the detection model has a significant impact on its detection performance. Therefore, this embodiment optimizes the parameters of the ResNet CBM model to achieve the best performance of the model. However, the setting of hyperparameters has randomness and largely relies on experimental experience.

Due to the input dimension of chiller unit fault data being 64, the channel reduction ratio in the multi-layer perceptron (MLP) in CBAM is generally the input dimension factor of chiller unit fault data. After trying various reduction ratios (such as 8, 16, 32), it is determined through experiments that r=16 may provide the best diagnostic performance.

The function of the two fully connected layers in the MLP in CBAM is to perform compression and expansion of features, together with the nonlinear activation function, to realize the calculation of the channel attention weights, so as to enhance the model's ability of focusing on the key features. The MLP includes two fully connected layers in the channel attention module, and the first one reduces the number of channels to 4 through the reduction ratio to carry out feature screening in low dimensional space, in the process of dimensionality reduction, the number of parameters and computational complexity is reduced, and the key feature information input into the MLP is retained by reducing the dimensionality and the amount of information; the second fully connected layer restores the compressed channel number of 4 to 64 dimensions, maps low dimensional features back to high-dimensional space, and reconstructs richer feature representations, i.e., enhances the features; weight weighting of key features is achieved through the activation function Sigmoid in the second fully connected layer. Overall, the expansion process enhances and weights the key features selected by the compression process.

Figure 5A:
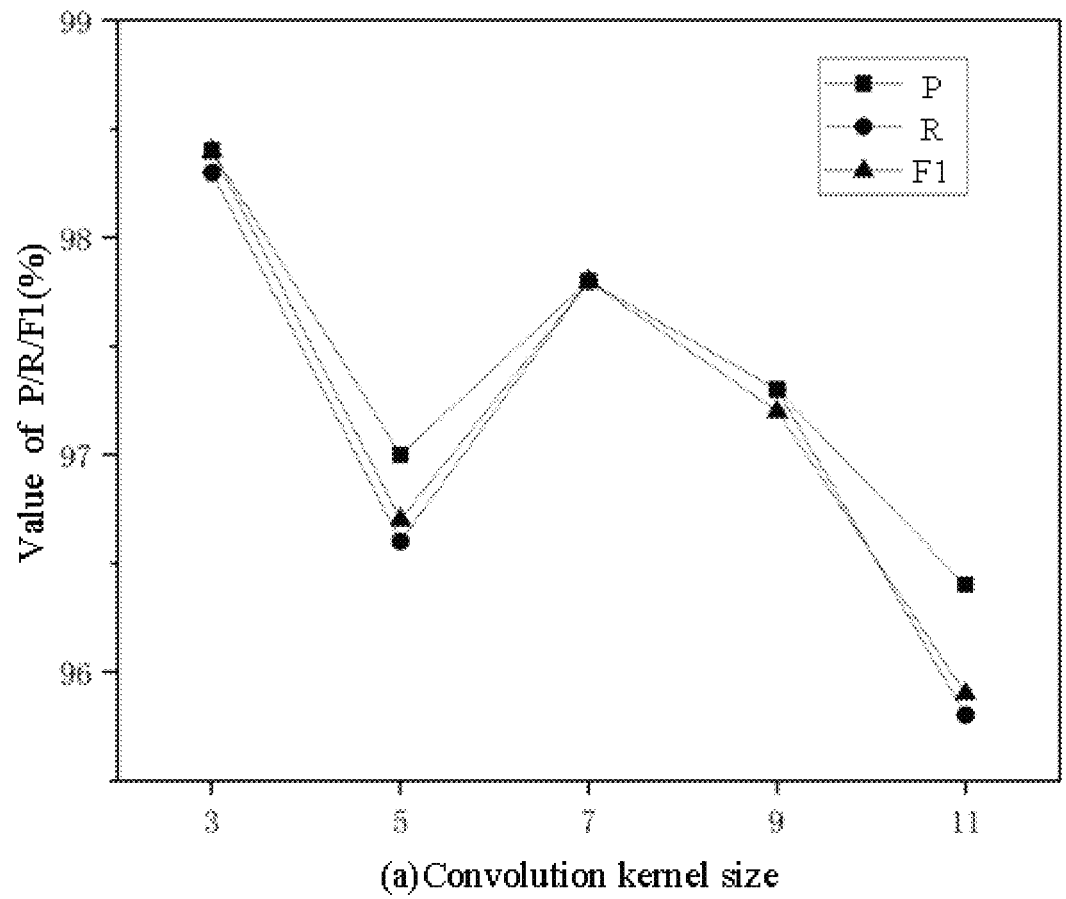
FIG. 5A shows a graph of adjusting and optimizing convolution kernel sizes in ResNet-CBAM model in the present disclosure.
Figure 5B:
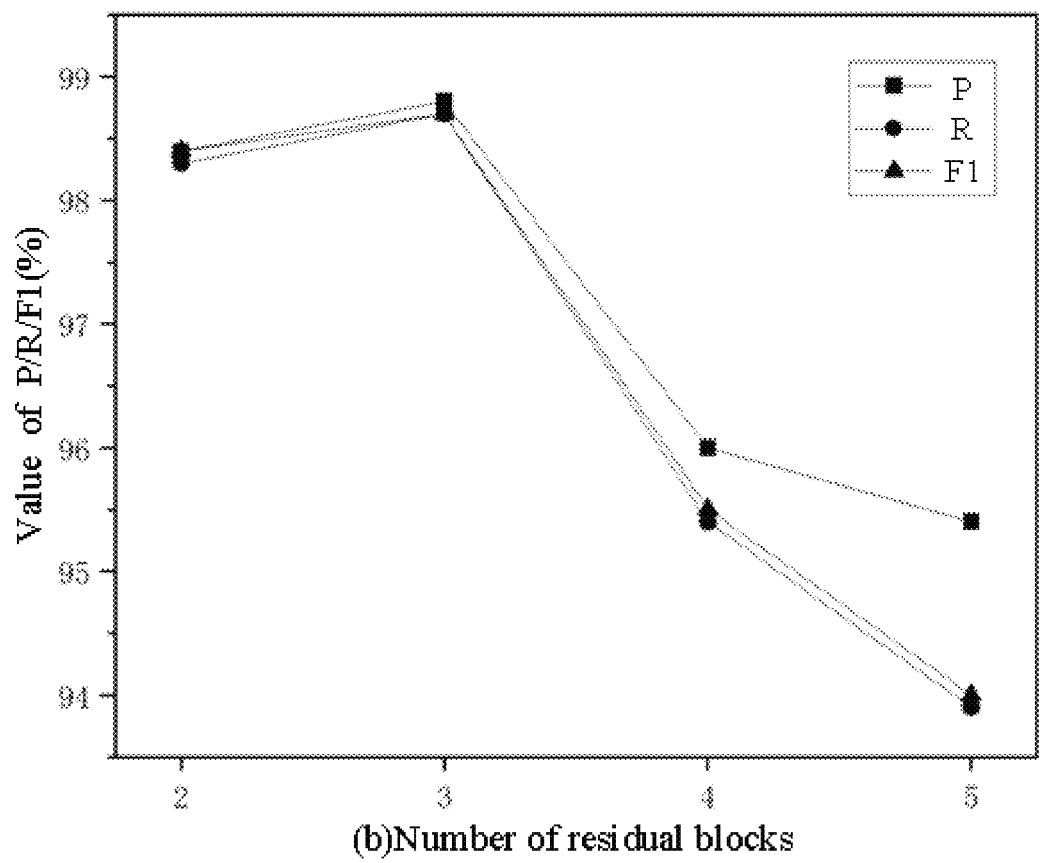
FIG. 5B shows a graph of adjusting and optimizing a number of residual blocks in ResNet-CBAM model in the present disclosure.
Figure 5C:
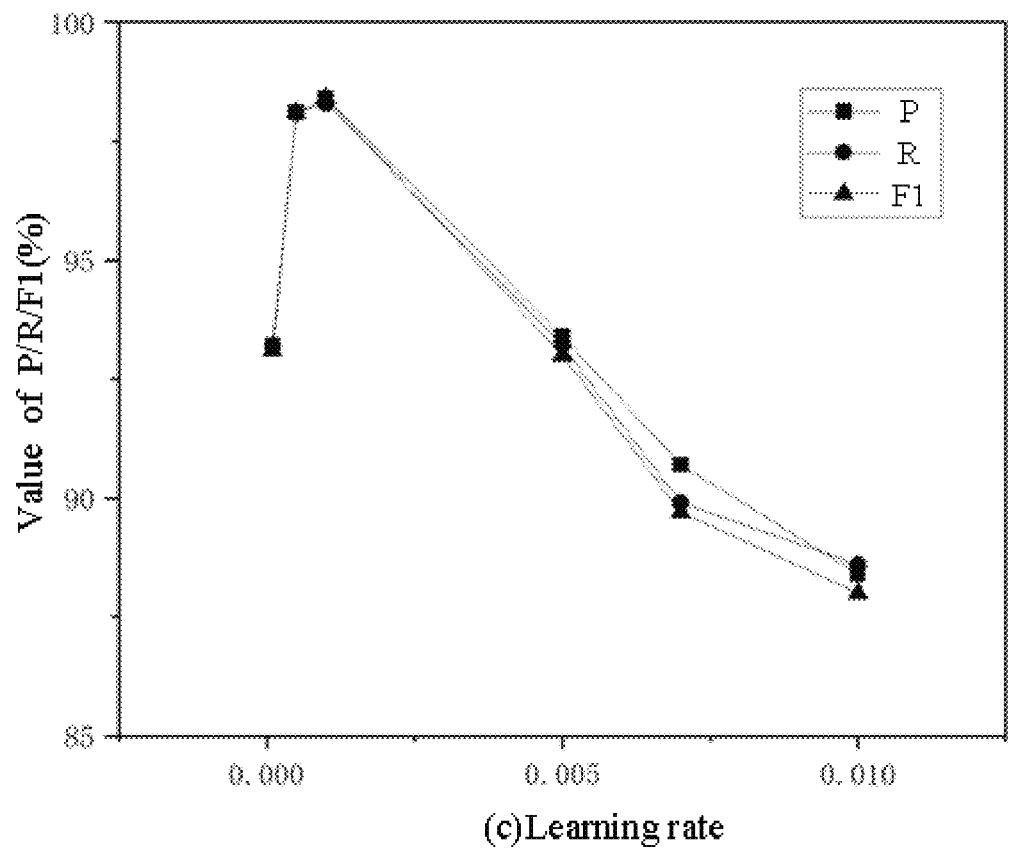
FIG. 5C shows a graph of adjusting and optimizing the learning rate in ResNet-CBAM model in the present disclosure.

The initial hyperparameters of the detection model used are shown in Table 2. This embodiment compares the impact of key hyperparameters on the diagnostic performance of the model through experiments. In each experiment, one hyperparameter is adjusted, the other hyperparameters are unchanged, the experiment process is repeated 5 times, and the average value of the diagnostic indices is recorded. The experimental results are shown in FIG. 5A to FIG. 5C. The final number of residual blocks in the ResNet CBM model is determined to be 3, with 2 convolutional layers per residual block, for a total of 6 convolutional layers, denoted as ResNet-6. ResNet-6 reduces 15 convolutional layers compared to ResNet_21. The convolution kernel size in ResNet-6 is 3, with a learning rate of 0.001, and the fault diagnosis performance is best. The remaining hyperparameters are consistent with Table 2.

TABLE 2

Initial hyperparameters of ResNet CBM network structure

| Model parameter | Hyperparameter setting |
|---|---|
| Batch size | 128 |
| Epoch (training cycle) | 80 |

TABLE 2-continued

Initial hyperparameters of ResNet CBM network structure

| Model parameter | Hyperparameter setting |
| --- | --- |
| Learn rate | 0.001 |
| ResNet module CBAM module | Number of residual blocks: 5<br>Convolution kernel size: 7<br>Number of convolution kernels: 64<br>dropout: 0.2<br>Activation function: Relu |
| Channel attention module | Input dimensions: 64 (consistent with output dimensions of ResNet)<br>Channel reduction ratio: 16 |
| Spatial attention module | Multi-scale convolutional kernel size: 3,5,7 |
| FC (linear layer) | Input dimension: 64 (consistent with output dimensions of CBAM)<br>Input dimension: 8 (consistent with output dimensions of classification categories) |

The ResNet CBM model includes ResNet module and CBAM.

The ResNet module includes three residual blocks connected in sequence; each of the residual blocks includes a first one-dimensional convolutional neural network (1DCNN) layer, an activation function layer, a batch normalization (BN) layer, a second 1DCNN layer, a Dropout (random deactivation) layer, and an identity mapping layer, which are sequentially connected to extract relevant features from each layer; the input of the first 1DCNN layer and the output of the Dropout layer are jointly input to the identity mapping layer for superposition.

Based on the above structure, the internal structure of the residual block includes two main branches, one branch performs constant mapping x, i.e., the input features of the first residual block, and the other branch is the residual information F(x) learned by each neural network layer, which are added together to form the output H(x) of the residual block.

The formula for constructing the residual blocks is as follows:

$$H(x) = F(x) + x; \quad (10)$$

The CBAM includes sequentially connected Channel Attention Module and Spatial Attention Module, and multi-scale convolution is introduced in the Spatial Attention Module to capture different receptive field features in the feature map.

The working process of ResNet-CBAM model is as follows:

S401: During the operation of the ResNet CBM model, N sequence data samples $X=[X_1, X_2, \ldots, X_N]$ with a time step are input into the ResNet module.

The first 1DCNN layer of the first residual block receives the operating sequence data of the chiller unit, and then each layer performs feature extraction in sequence. The output features of the Dropout layer are $Y_d=[Y_{d1}, Y_{d2}, \ldots, Y_{dn}]$ $$Y_d = \frac{1}{1-p} \times x, \quad (11)$$

where x is the input of Dropout, p is the dropout rate, 1/1−p is the scaling factor for ensuring that the expected value of the retained neurons is 1/1−p times the original expected value and keeping the expected value output by the Dropout layer unchanged.

The input features $X=[X_1, X_2, \ldots, X_N]$ are identity mapped and added with the output features $Y_d=[Y_{d1}, Y_{d2}, \ldots, Y_{dn}]$ of the Dropout layer, and then input to the next residual block.

The input of the first residual block is the operating data of the chiller unit, and the output of the last residual block is the output of the ResNet module; ResNet module outputs to the middle hidden layer.

The weight layer in ResNet is a 1DCNN layer, and during training, one-dimensional convolution and BN operations are performed on the $w_{train}$ in the ResNet module. BN helps alleviate internal covariate bias. The Dropout layer randomly closes some neurons of the second 1DCNN layer with a probability of p=0.2 to reduce the risk of overfitting and enhance the generalization ability of the model.

The formula for one-dimensional convolution is as follows:

$$x_i^l = f\left(\sum_{i=1}^{N} x_i^{l-1} * k_{ij}^l + b_j^l\right), \quad (12)$$

where N denotes the number of convolution kernels in the l−1-th layer, $x_i^l$ denotes the i-th feature mapping in the l-th layer, $k_{ij}^l$ denotes the corresponding convolution kernel weight matrix, $b_j^l$ denotes the bias term, f(·) denotes the nonlinear activation function, and the Relu activation function is used in the ResNet module in this disclosure.

The main function of the Rectified Linear Unit (ReLU) activation function is to introduce a nonlinear mapping that allows the network to learn more complex feature representations. The formula for the ReLU activation function is as follows, and X denoting the input features:

$$F(x) = \max(0, x), \quad (13)$$

The formula for BN is as follows:

$$\hat{x}_i = \frac{x_i - \mu}{\sqrt{\sigma^2 + \varepsilon}}, \quad (14)$$

where $\hat{x}_i$ is the normalized eigenvalue, representing the result of input features $x_i$ after batch normalization process, μ and σ is the mean and standard deviation of input features $x_i$ in a batch, and ε is a smaller positive constant that ensures division stability and is used to prevent the case of zero variance and avoid the problem of dividing by zero.

Figure 3:
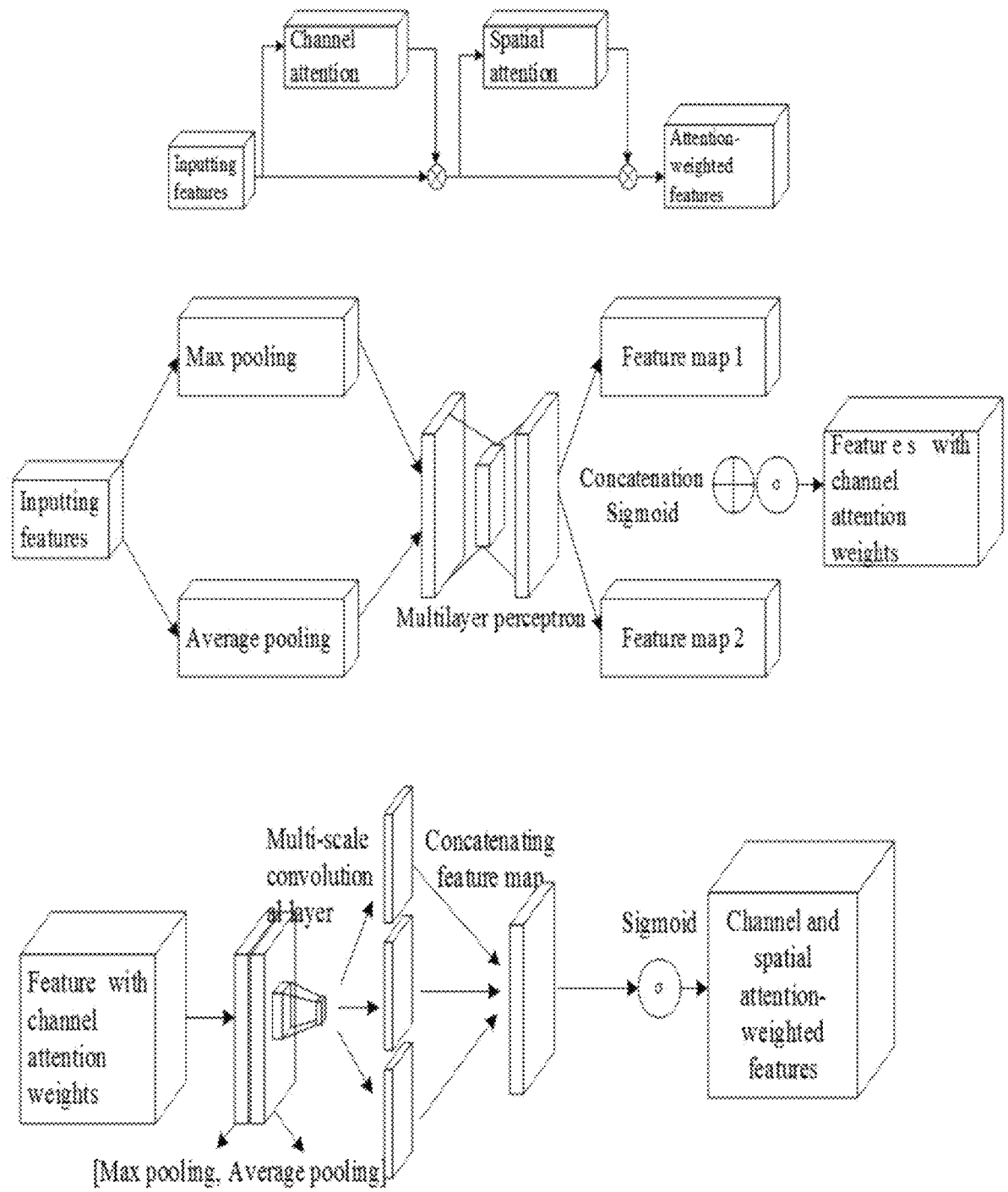
FIG. 3 shows a structural diagram of CBAM in the present disclosure.
Figure 4:
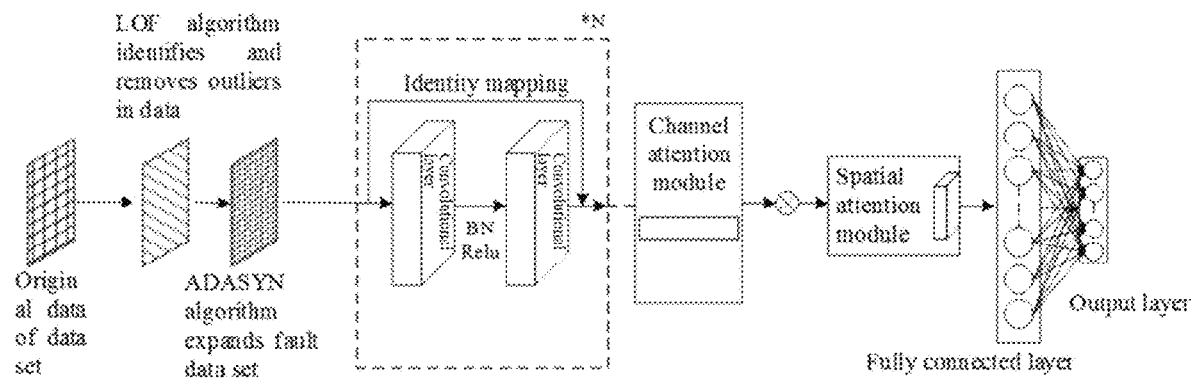
FIG. 4 shows a schematic structural diagram of LOF-ADASYN-ResNet-CBAM model used in the present disclosure.

Relevant features are extracted through the ResNet module to obtain the hidden layer output feature $h=[h_1, h_2, \ldots, h_N]$ S402: The hidden layer output h is first subjected to Global Max Pooling (Maxpool) and global Average Pooling (Avgpool) by Channel Attention Module in the CBAM to obtain $F_{max}^s$ and $F_{avg}^c$, respectively, and then $F_{max}^s$ and $F_{avg}^c$ are processed by the multilayer perceptron (MLP) to generate the feature map 1 and feature map 2 in the figure of the Channel Attention Module, respectively, as shown in FIG. 3. Max Pooling is used to capture the most salient features in each channel, while Average Pooling is used to capture the average features in each channel. In the hidden layer of the MLP, channel dimensionality is reduced using channel reduction ($R^{C/r*1*1}$, where r is the reduction ratio). After the feature map 1 and feature map 2 are elementally concatenated (Concat) and activated by the Sigmoid function, each element in the new feature map is given a new weight, i.e., channel attention weight $M_C(F)=[M_1, M_2, \ldots, M_N]$. The specific process of weight calculation is as follows:

$$M_C(F) = \sigma(MLP(AvgPool(F)) + MLP(Maxpool(F))) = \sigma(W_1(W_0(F^c_{avg})) + W_1(W_0(F^c_{max}))), \quad (15)$$

where W1 and W0 are the weights of the MLP and the inputs of both are shared. $F_{max}^s$ and $F_{avg}^c$ denote the Max Pooling and Average Pooling operations, respectively, and $\sigma(\cdot)$ denotes the Sigmoid function, as shown in formula (16):

$$\sigma(x) = \frac{1}{1-e^{-x}}, \quad (16)$$

Subsequently, the spatial attention module receives the channel attention weight features as inputs, performs Max Pooling and Average Pooling on the channel of each feature point to obtain $F_{max}^s$ and $F_{avg}^c$, respectively, the two obtained feature maps are made channel-based concatenated and operated by multi-scale convolution, multi-scale convolution is able to consider different sizes of sensory fields at the same time and capture different scales of information spatially, and then feature fusion is performed, so as to obtain richer and more comprehensive feature representations and to improve the performance of the model. Then, it is activated by the Sigmoid function to obtain the spatial attention weight $M_s(F)=[M_{s1}, M_{s2}, \ldots, M_{sN}]$, and at the same time, the feature vector $Y=[Y_1, Y_2, \ldots, Y_N]$ after weighting the weights of the CBAM is obtained. The specific process of weight calculation is shown in Formula 17:

$$M_s(F) = \sigma(f^{n1} + f^{n2} + f^{n3}([AvgPool(F); MaxPool(F)])) = \sigma(f^{n1} + f^{n2} + f^{n3}([F^s_{avg}; F^s_{max}])), \quad (17)$$

where $f^{n1}$, $f^{n2}$ and $f^{n3}$ are the convolution kernel sizes of the three convolutional layers in the spatial attention module, respectively, and satisfies the constraints n1+2=n2=n3−2, where n1, n2 and n3 are positive integers.

S403: The feature vector $Y=[Y_1, Y_2, \ldots, Y_N]$ obtained by weighting the weights of the CBAM is input to the fully connected layer. The weight parameters in the fully connected layer combine the extracted features from the ResNet-CBAM model to generate a high-dimensional global feature $Z=[Z_1, Z_2, \ldots, Z_{N'}](N'>N)$ The weight parameters are learned and updated during the training process by a back-propagation algorithm to minimize the loss function and optimize the performance of the network. Next, the global feature $Z=[Z_1, Z_2, \ldots, Z_{N'}]$ is input into the output layer, and in this process, it needs to ensure that the output and input dimensions of both the fully connected layer and the output layer are consistent. The output layer uses a Softmax function to convert the raw scores output from the model into a probability distribution for classification decisions.

$$\text{Soft max}(z)_i = \frac{e^{z_i}}{\sum_{j=1}^{K} e^{z_j}}, \quad (18)$$

where Softmax $(z)_i$ represents the i-th element in the output vector of the Softmax function, e is the base of the natural logarithm, K is the length of vector z, and the Softmax function converts each element $z_i$ in the vector into a real number between (0,1), so that the sum of all elements is 1.

The output dimension of this output layer contains n neurons, so as to diagnose n states of the chiller unit, namely n−1 fault states and 1 normal state. The optimization algorithm uses Yogi, Yogi is an optimization algorithm based on second-order degree estimation, combines the characteristics of Adam and RMSProp, and adjusts the learning rate based on the historical gradient information of the parameters. The loss function adopts Categorical Cross Entropy to update the model parameters w and b, so as to improve the probability of correct classification. After training the ResNet CBM model, the optimal weights of the model are saved.

Figure 6:
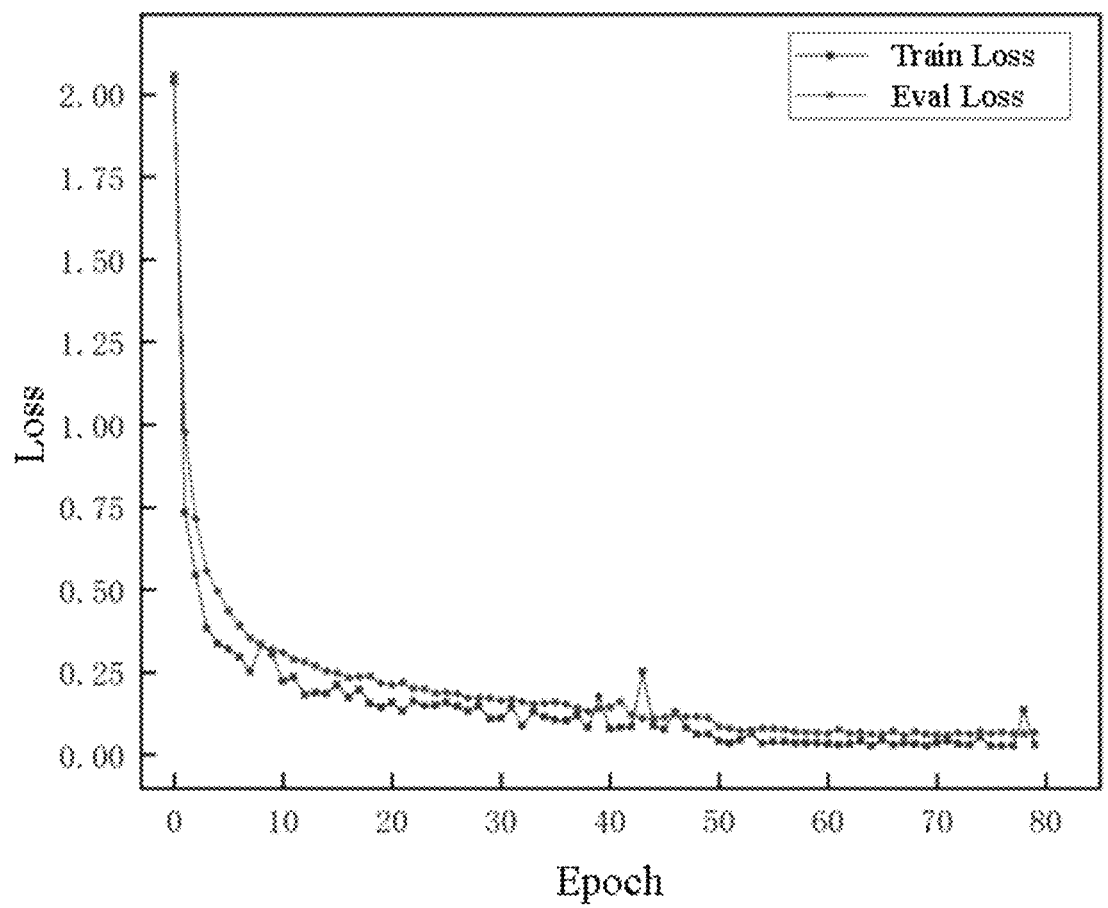
FIG. 6 shows loss function curves for the training sample set and validation sample set under the balanced data set of the ResNet-CBAM model in the present disclosure.

S5: saving the optimal weights of the model after training the ResNet-CBAM model on the training sample set $w_{train}$ and validation sample set $w_{val}$, and at the same time, generating the loss function curve. The loss function curve is a graph used to measure the difference between the predicted values and the observed values of the model during the iterative training of the model, and as the training proceeds, the loss curve decreases, indicating that the model fitting effect to the training data is gradually improved. In this embodiment, the loss function curve under the balanced data set is shown in FIG. 6. The optimization algorithm uses Yogi, Yogi is an optimization algorithm based on second-order degree estimation, combines the characteristics of Adam and RMSProp, and adjusts the learning rate based on the historical gradient information of the parameters. The loss function adopts Categorical Cross Entropy to update the model parameters, so as to improve the probability of correct classification.

S6: Loading the model weights obtained in S4 onto the test sample set $w_{test}$, and obtaining the diagnostic results of the final output layer as the basis for fault detection.

S7: expanding the fault data set using LOF-ADASYN, where during the fault data expansion process, different oversampling rates are used to collect different amounts of fault data, and the training process repeating the above steps after achieving data balance.

The classical deep learning model 1DCNN, GRU, ResNet model and the combined model are selected for fault diagnosis performance comparison, where SA is the self-attention mechanism and MHSA is the multi-head self-attention mechanism. The fault diagnosis results of the three embodiments are shown in Table 3 to Table 7 below.

TABLE 3

Fault diagnosis model results for a chiller unit in a balanced embodiment

|  | 1DCNN | | | GRU | | | ResNet_6 | | | ResNet_6-CBAM | | |
| --- | --- | --- | --- | --- | --- | --- | --- | --- | --- | --- | --- | --- |
| State types | P/% | R/% | F1/% | P/% | R/% | F1/% | P/% | R/% | F1/% | P/% | R/% | F1/% |
| EO | 75.1 | 85.9 | 79.4 | 89.1 | 86.1 | 87.6 | 93.3 | 95.5 | 94.4 | 90.7 | 99.2 | 94.8 |
| RO | 78.2 | 87.7 | 82.7 | 82.4 | 87.7 | 85.4 | 87.6 | 91.4 | 89.5 | 97.6 | 92.7 | 93.1 |
| RL | 84.1 | 67.0 | 74.5 | 86.5 | 78.1 | 82.2 | 94.5 | 90.8 | 92.6 | 94.0 | 92.0 | 93.0 |
| CF | 99.7 | 99.3 | 99.5 | 94.7 | 96.8 | 95.8 | 98.5 | 99.7 | 99.1 | 98.6 | 100 | 99.3 |
| NC | 98.2 | 99.4 | 98.8 | 99.4 | 99.7 | 99.8 | 100 | 99.1 | 99.5 | 100 | 99.4 | 99.7 |
| FWC | 99.4 | 99.7 | 99.8 | 99.0 | 99.3 | 99.2 | 99.7 | 100 | 99.8 | 100 | 100 | 100 |
| FWE | 100 | 99.7 | 99.8 | 99.0 | 99.3 | 99.2 | 100 | 99.7 | 99.8 | 100 | 99.7 | 99.8 |
| NOR | 97.4 | 79.2 | 87.4 | 87.7 | 93.8 | 90.6 | 98.6 | 99.3 | 98.9 | 97.5 | 96.2 | 96.9 |

Table 4 Overall evaluation indexes for fault diagnosis model results for a chiller unit in a balanced embodiment

| Detection model | Acc/% | P1% | R/% | F1/% |
| --- | --- | --- | --- | --- |
| 1DCNN | 91.0 | 91.6 | 89.7 | 90.2 |
| GRU | 92.7 | 92.8 | 93.0 | 92.7 |
| ResNet_6 | 96.4 | 96.5 | 96.9 | 96.7 |
| ResNet_6-CBAM | 97.3 | 97.3 | 97.4 | 97.3 |

From Table 3 and Table 4, it may be seen that under the balanced data set, the recognition accuracies of both the 1DCNN and GRU models for the three types of system faults, EO, RO, and RL, are significantly lower than that of the ResNet_6 model. ResNet_6 model focuses more on extracting the key features by digging deeper into the information in the data with the incorporation of the CBAM. For detection effects for the four types of localized faults, the ResNet_6-CBAM model is little better than the other three detection models.

TABLE 5

Fault diagnosis model results for a chiller unit in an unbalanced embodiment

|  | 1DCNN | | | GRU | | | ResNet_6 | | | ResNet_6-CBAM | | |
| --- | --- | --- | --- | --- | --- | --- | --- | --- | --- | --- | --- | --- |
| State type | P/% | R/% | F1/% | P/% | R/% | F1/% | P/% | R/% | F1/% | P/% | R/% | F1/% |
| EO | 90.1 | 91.6 | 90.8 | 66.7 | 92.9 | 77.6 | 93.8 | 89.3 | 91.5 | 86.7 | 92.0 | 89.3 |
| RO | 82.1 | 69.7 | 75.4 | 80.8 | 84.8 | 82.8 | 84.2 | 64.6 | 73.1 | 97.2 | 70.7 | 81.9 |
| RL | 61.0 | 63.4 | 62.2 | 87.0 | 69.8 | 77.5 | 85.3 | 75.7 | 80.2 | 93.8 | 81.2 | 87.0 |
| CF | 96.0 | 96.5 | 96.2 | 95.9 | 94.0 | 94.9 | 96.9 | 95.0 | 95.9 | 99.5 | 99.5 | 99.5 |
| NC | 95.6 | 94.0 | 94.7 | 96.0 | 95.5 | 95.7 | 97.6 | 100 | 98.8 | 98 | 100 | 99.4 |
| FWC | 99.0 | 100 | 99.5 | 97.5 | 97.9 | 97.6 | 98.6 | 99.0 | 98.7 | 100 | 100 | 100 |
| FWE | 99.1 | 97.2 | 98.1 | 98.6 | 99.0 | 98.7 | 96.3 | 95.5 | 95.9 | 97.6 | 97.9 | 97.7 |
| NOR | 89.8 | 91.0 | 90.4 | 79.1 | 89.3 | 83.9 | 75.4 | 98.0 | 85.2 | 94.5 | 100 | 97.1 |

Table 6 Overall evaluation indexes for fault diagnosis model results for a chiller unit in an unbalanced embodiment

| Detection model | Acc/% | P/% | R/% | F1/% |
| --- | --- | --- | --- | --- |
| 1DCNN | 89.1 | 89.0 | 87.9 | 88.4 |
| GRU | 87.8 | 87.7 | 90.4 | 88.6 |
| ResNet_6 | 90.9 | 91.0 | 89.6 | 89.9 |
| ResNet_6-CBAM | 96.0 | 96.7 | 92.7 | 94.0 |

From Tables 5 and 6, it may be seen that the diagnostic accuracy of RO, RL faults under the unbalanced data set has a significant decreasing trend compared to the previous embodiment. Especially for RL faults, the diagnosis rate of each model shows a substantial decrease. For the four types of localized faults, there is a small decrease in the degree of fault recognition of the four models.

As may be seen from Table 6, in the overall evaluation index, ResNet_6 model has the most obvious decline, with a decrease of 5.9% in the accuracy rate, 5.5% in the precision rate, 7.3% in the recall rate, and 6.8% in the F1.

Table 7 Overall evaluation indexes for fault models for a chiller unit under different oversampling rates according to LOF-ADASYN

| | Oversampling rates | | | | | | | | | | | |
|---|---|---|---|---|---|---|---|---|---|---|---|---|
| | 100% | | | 200% | | | 300% | | | 400% | | |
| | Evaluation indexes | | | | | | | | | | | |
| Detection models | P/% | R/% | F1/% | P/% | R/% | F1/% | P/% | R/% | F1/% | P/% | R/% | F1/% |
| 1DCNN | 83.3 | 83.7 | 82.9 | 92.6 | 92.6 | 92.6 | 88.0 | 87.7 | 87.8 | 85.3 | 84.4 | 83.5 |
| 1DCNN-SA | 87.6 | 85.4 | 85.3 | 94.3 | 94.2 | 94.1 | 91.7 | 91.7 | 91.6 | 85.3 | 79.4 | 79.0 |
| GRU | 86.4 | 86.5 | 86.4 | 92.4 | 92.7 | 92.5 | 86.8 | 86.6 | 86.7 | 89.0 | 88.4 | 88.1 |
| BIGRU-MHSA | 87.4 | 86.9 | 86.9 | 94.2 | 93.8 | 93.9 | 93.0 | 92.0 | 92.5 | 90.8 | 91.0 | 90.9 |
| ResNet_6 | 89.3 | 88.0 | 87.8 | 92.6 | 92.8 | 92.7 | 90.5 | 90.7 | 90.5 | 84.2 | 81.3 | 82.7 |
| ResNet_6-SA | 92.5 | 92.2 | 92.1 | 94.3 | 93.8 | 93.9 | 94.5 | 94.0 | 94.2 | 93.2 | 94.2 | 93.7 |
| ResNet_6-CBAM | 97.3 | 97.2 | 97.2 | 98.5 | 98.5 | 98.5 | 97.3 | 97.2 | 97.2 | 96.5 | 96.4 | 96.4 |

Figure 7:
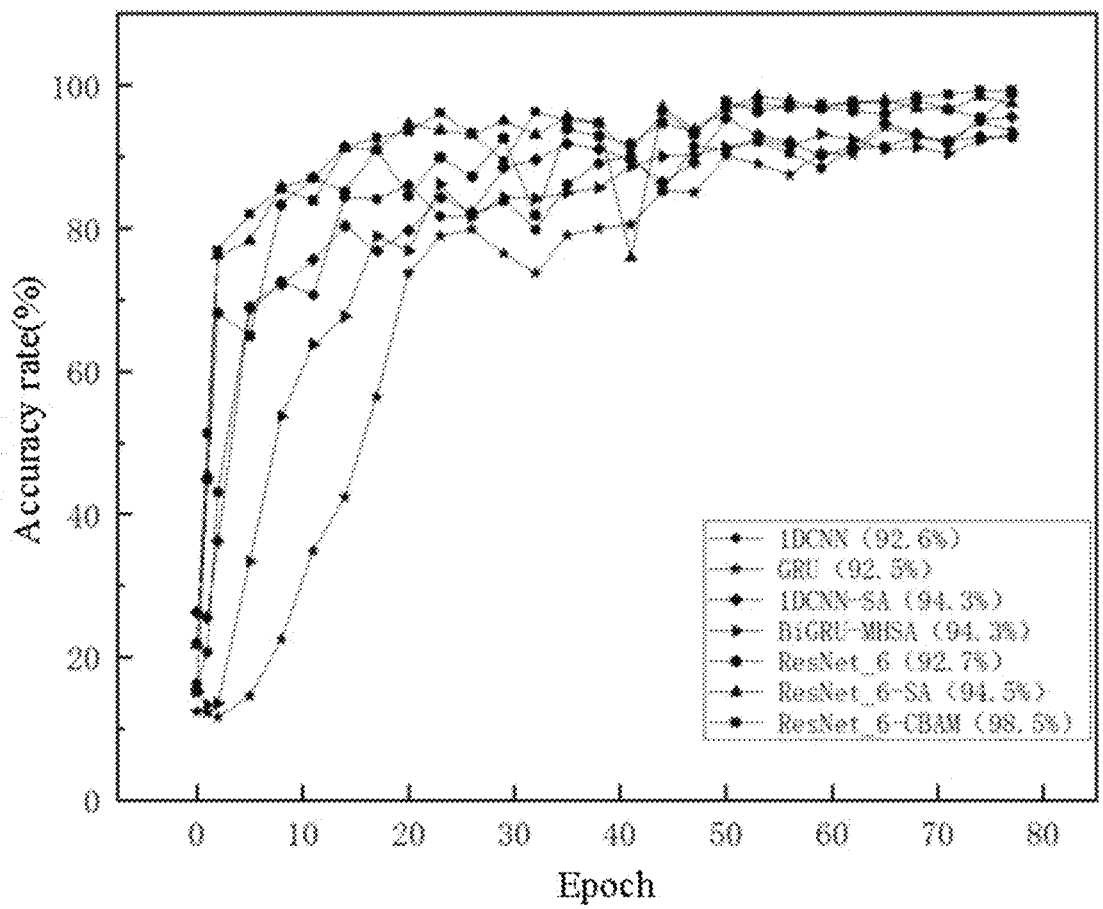
FIG. 7 shows iterative curves of the accuracy rates of detection models at an oversampling rate of 200% for the present disclosure.
Figure 8:
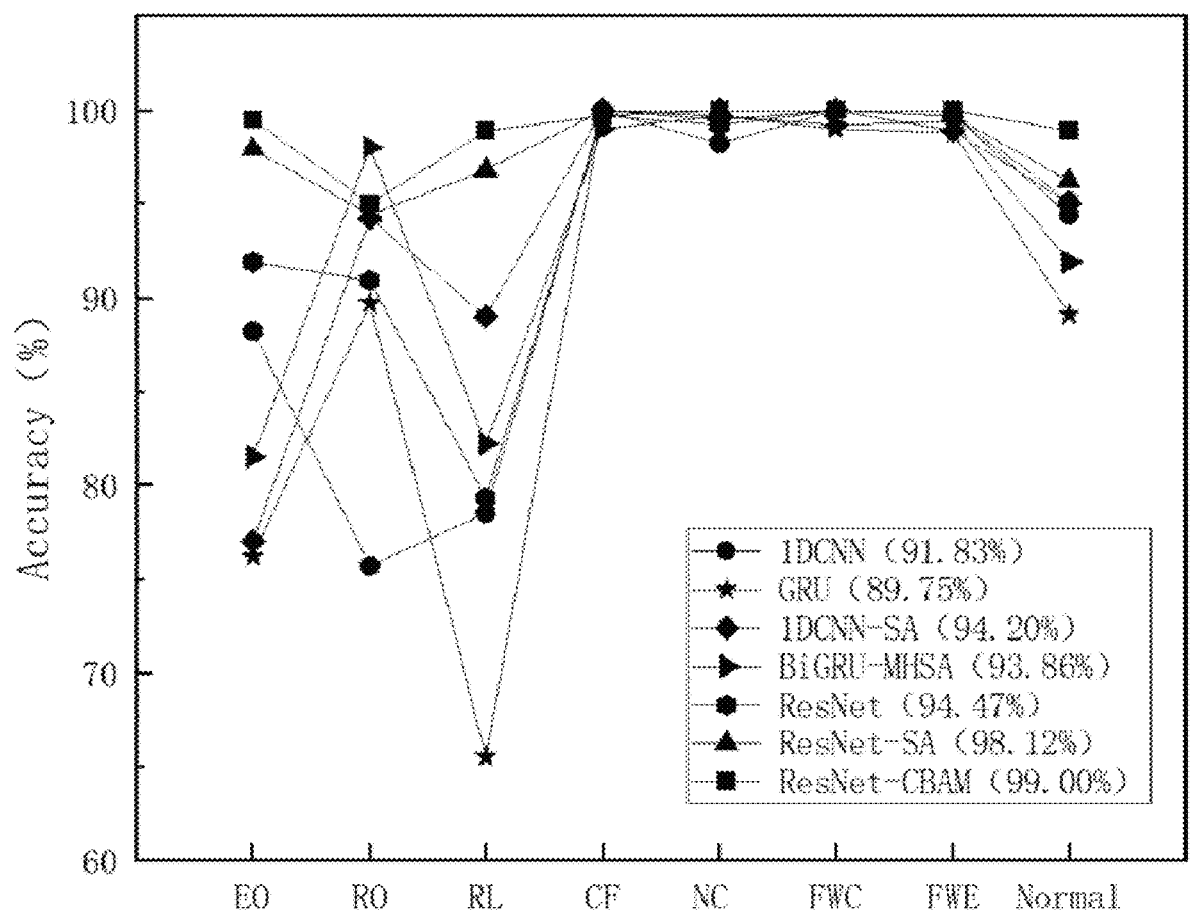
FIG. 8 shows a graph comparing the diagnostic results of the model used in the present disclosure with a plurality of existing models on a test sample set at an oversampling rate of 200%.

In Table 7, SA above denotes the self-attentive mechanism and MHSA is the multi-head self-attentive mechanism. As may be seen from Table 7, all seven models are experimented at four different oversampling rates. It may be seen that the ResNet_6-CBAM model proposed in this embodiment outperforms the other control models in all three overall evaluation indexes at each oversampling rate. At an oversampling rate of 200%, the diagnostic accuracy of the ResNet_6-CBAM model is improved by 6.1%, the recall rate is improved by 5.8%, and the F1 is improved by 6.0% compared to the GRU with the lowest metrics. FIG. 7 shows the iterative curves of the accuracy of each detection model at the oversampling rate of 200%, and the accuracy curve of the ResNet_6-CBAM model is the most stable relative to the other three models. FIG. 8 shows the diagnostic results of each detection model on the test set at the oversampling rate of 200%. It may be concluded that the ResNet_6-CBAM model has the highest robustness and the strongest generalization.

Table 8 Comparison of fault diagnosis results for a chiller unit for different cases of

| ResNet_6-CBAM models | | | | |
|---|---|---|---|---|
| Detection models | Acc/% | P/% | R/% | F1/% |
| Balanced data set | 97.3 | 97.3 | 97.4 | 97.3 |
| Unbalanced data set | 96.0 | 96.7 | 92.7 | 94.0 |
| Only using ADASYN at the oversampling rate of 200% | 98.0 | 98.0 | 98.0 | 98.0 |
| Using LOF-ADASYN at the oversampling rate of 200% | 98.5 | 98.5 | 98.5 | 98.5 |

Embodiment 2

The embodiment provides a fault detection method for refrigeration units based on an improved deep learning model, and this embodiment differs from the Embodiment 1 in that the refrigeration unit in this embodiment is specifically an air-cooled heat pump unit.

This embodiment relies on the existing laboratory experimental equipment of the air-cooled heat pump unit to design and build a fault simulation test bench. Based on the enthalpy difference method as the basic measurement method for this test bench, the object to be diagnosed is introduced, various sensors are installed on the tested air-cooled heat pump unit, the original system is modified appropriately, and then a plan for simulating faults is developed to simulate the fault states of the air-cooled heat pump unit.

The tested machine is a split heat pump floor type air conditioner, model: KFR-72LW, the rated cooling capacity of the unit is 7.2 kW, and the heating capacity is 8 kW, both the evaporator and condenser use an air-finned tube heat exchanger, the throttling device uses a thermal expansion valve, and the inlet to the compressor is equipped with a thermal expansion valve thermal bulb.

In the small air-cooled heat pump unit on the test bench, C#host computer software is designed, 18 temperature sensors and 4 pressure sensors are arranged, the data is collected every 10 seconds, and finally, 22 channels of sensor data is successfully acquired.

Table 9 Fault types of the air-cooled heat pump unit

| Fault types | Abbreviate |
|---|---|
| Condenser Surface Area Fouling | CSAF |
| Refrigerant Undercharge | RU |
| Four-way Valve Leakage | FWVL |
| Normal | Nor |

In an embodiment under the balanced data set, 400 pieces of data of each state are selected to constitute a sample data set ω of a 1600×22 dimensional matrix, and the sample data set ω is randomly divided into a training set, a validation set, and a test set in a 6:2:2 ratio;

In an embodiment under the unbalanced data set, 400 pieces of data in the normal state and 200 pieces of data of each fault state are selected to conduct experiments under the unbalanced ratio of 2:1, and the data set division method is consistent with that of the embodiment under the balanced data set;

In the embodiment of using LOF-ADASYN to expand the fault data set, finally, under the balanced data set, the data in each state of the training set and the validation set are 400 pieces, for this purpose, 400 pieces of data are taken from the normal state, for the rest of fault states, the outliers in the fault data set are firstly removed by using the LOF algorithm, and then different amounts of data are collected by using the ADASYN method in accordance with different oversampling rates (200 pieces of data for original each fault state at 100% oversampling rate, and 133 pieces of data for original each fault state at 200% oversampling rate), and finally data balance is achieved. The training set and validation set total about 1,600 pieces of data, and a ratio of the training set and the validation set is 5:1, and 500 pieces of original data of the air-cooled heat pump data set are additionally selected for the test set, that is, 125 pieces of data for each type, to verify the generalization ability of the deep learning model.

In the ResNet_6-CBAM model of this embodiment, the input dimension of the ResNet module and the channel reduction ratio of MLP in CBAM are changed. The input dimension of the ResNet module is 22, and the channel reduction ratio of MLP in CBAM is the input dimension factor of the fault data of the air-cooled heat pump unit. after the reduction ratios are tried 2 and 11, it was experimentally determined that r=11 provides the best diagnostic performance. The other hyperparameters of the ResNet_6-CBAM model are consistent with the chiller unit fault diagnosis embodiment.

Table 10 Fault diagnosis model results for an air-cooled heat pump unit in a balanced embodiment

| State types | 1DCNN P/% | 1DCNN R/% | 1DCNN F1/% | GRU P/% | GRU R/% | GRU F1/% | ResNet_6 P/% | ResNet_6 R/% | ResNet_6 F1/% | ResNet_6-CBAM P/% | ResNet_6-CBAM R/% | ResNet_6-CBAM F1/% |
|---|---|---|---|---|---|---|---|---|---|---|---|---|
| CSAF | 100 | 100 | 100 | 100 | 100 | 100 | 100 | 100 | 100 | 100 | 100 | 100 |
| RU | 100 | 100 | 100 | 100 | 100 | 100 | 100 | 100 | 100 | 100 | 100 | 100 |
| FWVL | 81.9 | 81.3 | 81.6 | 59.3 | 87.3 | 70.6 | 86.1 | 78.7 | 82.2 | 98.6 | 94.0 | 96.2 |
| Nor | 81.8 | 82.4 | 82.1 | 76.8 | 41.2 | 53.6 | 80.7 | 87.6 | 84.0 | 94.4 | 98.7 | 96.5 |

Table 11 Overall evaluation indexes for fault diagnosis model results for the air-cooled heat pump unit in a balanced embodiment

| Detection model | Acc/% | P/% | R/% | F1/% |
|---|---|---|---|---|
| 1DCNN | 89.0 | 90.9 | 90.9 | 90.9 |
| GRU | 78.2 | 84.2 | 82.1 | 81.0 |
| ResNet_6 | 89.8 | 91.7 | 91.6 | 91.6 |
| ResNet_6-CBAM | 98.2 | 98.2 | 98.2 | 98.2 |

Table 12 Fault diagnosis model results for an air-cooled heat pump unit in an unbalanced embodiment

| State types | 1DCNN P/% | 1DCNN R/% | 1DCNN F1/% | GRU P/% | GRU R/% | GRU F1/% | ResNet_6 P/% | ResNet_6 R/% | ResNet_6 F1/% | ResNet_6-CBAM P/% | ResNet_6-CBAM R/% | ResNet_6-CBAM F1/% |
|---|---|---|---|---|---|---|---|---|---|---|---|---|
| CSAF | 100 | 100 | 100 | 85.5 | 100 | 92.2 | 100 | 100 | 100 | 100 | 100 | 100 |
| RU | 100 | 100 | 100 | 96.7 | 74.7 | 84.3 | 100 | 100 | 100 | 100 | 100 | 100 |
| FWVL | 95.6 | 94.0 | 94.7 | 75.9 | 27.3 | 40.2 | 73.5 | 81.3 | 77.2 | 99.2 | 86.0 | 92.1 |
| Nor | 99.0 | 100 | 99.5 | 56.7 | 91.5 | 70.0 | 79.6 | 71.2 | 75.2 | 87.9 | 99.3 | 93.3 |

Table 13 Overall evaluation indexes for fault diagnosis model results for the air-cooled heat pump unit in an unbalanced embodiment

| Detection model | Acc/% | P/% | R/% | F1/% |
|---|---|---|---|---|
| 1DCNN | 87.6 | 92.8 | 89.7 | 89.3 |
| GRU | 71.6 | 78.7 | 73.4 | 71.7 |
| ResNet_6 | 85.6 | 88.3 | 88.1 | 88.1 |
| ResNet_6-CBAM | 95.6 | 96.8 | 96.3 | 96.3 |

Table 14 Overall evaluation indexes for fault models for the air-cooled heat pump unit under different oversampling rates according to LOF-ADASYN

| Detection models | 100% P/% | 100% R/% | 100% F1/% | 200% P/% | 200% R/% | 200% F1/% | 300% P/% | 300% R/% | 300% F1/% | 400% P/% | 400% R/% | 400% F1/% |
|---|---|---|---|---|---|---|---|---|---|---|---|---|
| 1DCNN | 83.3 | 83.7 | 82.9 | 92.1 | 91.9 | 91.9 | 91.7 | 91.7 | 91.6 | 85.3 | 84.4 | 83.5 |
| 1DCNN-SA | 87.6 | 85.4 | 86.5 | 93.8 | 91.7 | 91.5 | 93.8 | 91.7 | 91.5 | 89.3 | 80.4 | 84.6 |
| GRU | 86.4 | 86.5 | 86.4 | 91.4 | 92.8 | 92.1 | 86.8 | 86.6 | 86.7 | 89.7 | 88.6 | 89.1 |
| BIGRU-MHSA | 90.4 | 92.9 | 91.6 | 94.5 | 93.0 | 92.9 | 91.5 | 92.0 | 91.7 | 90.8 | 91.0 | 90.9 |

-continued

| | Oversampling rates | | | | | | | | | | |
|---|---|---|---|---|---|---|---|---|---|---|---|
| | 100% | | | 200% | | | 300% | | | 400% | |
| | | | | | Evaluation indexes | | | | | | |
| Detection models | P/% | R/% | F1/% | P/% | R/% | F1/% | P/% | R/% | F1/% | P/% | R/% | F1/% |
| ResNet_6 | 90.6 | 84.7 | 83.2 | 93.5 | 92.9 | 92.8 | 89.5 | 81.5 | 78.7 | 92.7 | 89.5 | 89.1 |
| ResNet_6-SA | 89.0 | 84.1 | 82.5 | 95.3 | 94.2 | 94.1 | 93.5 | 93.0 | 93.2 | 91.1 | 93.1 | 92.0 |
| ResNet_6-CBAM | 93.9 | 94.1 | 94.0 | 98.8 | 98.7 | 98.7 | 94.9 | 93.5 | 93.4 | 96.5 | 96.4 | 964 |

Table 15 Comparison of fault diagnosis results for the air-cooled heat pump unit for different cases of ResNet_6-CBAM models

| Detection models | Acc/% | P/% | R/% | F1/% |
|---|---|---|---|---|
| Balanced data set | 97.6 | 97.7 | 97.6 | 97.6 |
| Unbalanced data set | 88.0 | 87.9 | 99.3 | 93.3 |
| Only using ADASYN at the oversampling rate of 200% | 97.4 | 97.6 | 97.4 | 97.4 |
| Using LOF-ADASYN at the oversampling rate of 200% | 98.7 | 98.8 | 98.7 | 98.7 |

To make the objectives, technical solutions and advantages of the embodiments of the present disclosure clearer, it should be understood by those of ordinary skill in the art to which it belongs that the discussion of any of the above embodiments is merely exemplary and is not intended to imply that the scope of the present disclosure is limited to these examples. In the context of the present disclosure, the parameters (e.g., number of network layers, etc.), hyperparameters (e.g., batch size, learning rate, dropout, etc.), optimization algorithms, activation functions, etc., in the above embodiments or in different embodiments, may be modified according to the actual practice and many other variations of different aspects of the present disclosure as described above, which for the sake of simplicity they have not been provided in the details.

Embodiments of the present disclosure are intended to cover all such substitutions, modifications, and variations that fall within the broad scope of the appended claims. Accordingly, all embodiments herein are within the scope of protection of the present disclosure.

What is claimed is:

1. A fault detection method for refrigeration units based on an improved deep learning model, comprising the following steps:
providing a refrigeration unit: wherein the refrigeration unit is a heat-pump air conditioning apparatus: the heat-pump air conditioning apparatus comprises an evaporator, a condenser, and a thermal expansion valve: wherein the evaporator and the condenser comprises air-cooled finned-tube heat exchangers: the thermal expansion valve serves as the throttling device; and a thermal-sensing bulb for the expansion valve is mounted at the compressor inlet:
S1: obtaining operating parameters of a refrigeration unit in a normal operating state and in states with different fault types as data sets, by a processor;
S2: detecting local outliers in the data set by using a local outlier factor algorithm and removing the local outliers, and then expanding the data set by using adaptive synthetic sampling, by a processor;
S3: normalizing the data set, by a processor;
S4: constructing a fault detection model, by a processor, wherein the fault detection model comprises a ResNet module and a CBAM module, the ResNet module comprises three residual blocks connected in sequence, each residual block is introduced with a Dropout layer, the Dropout layer randomly closes some neurons of a 1DCNN layer connected to it at a dropout rate p, and input of the residual block and output of the Dropout layer are identity mapped and added together as output of the residual block;
output of the ResNet module serves as input of the CBAM module; the CBAM module includes sequentially connected channel attention module and spatial attention module; in the spatial attention module, a channel attention weight output by the channel attention module are subjected to max pooling and average pooling on channels of each feature point to obtain feature maps $F_{max}^c$ and $F_{avg}^c$, respectively; and then the feature maps $F_{max}^c$ and $F_{avg}^c$ are concatenated based on the channels, and obtained features are subjected to convolution operations with three different scales; three results of the convolution operations are fuse and activated; sizes n1, n2 and n3 of convolution kernels of the convolution operations with three different scales satisfy a following constraint: n1+2=n2=n3−2, and n1, n2 and n3 are positive integers;
an output feature of the CBAM module is input to fully connected layers, and the fault detection model is trained by using the data set obtain in the S2; and
S5: inputting the parameters of a to-be-tested refrigeration unit into the fault detection model, and generating a table layout that allows visualization of the fault detection result.

2. The fault detection method for refrigeration units based on an improved deep learning model according to claim 1, wherein in the ResNet module, the input of a first residual block is operating data of the refrigeration unit, and the output of a last residual block is the output of the ResNet module; the ResNet module outputs to a middle hidden layer; an output feature h=[$h_1$, $h_2$, ... $h_N$] of the hidden layer obtained by the ResNet module extracting relevant features go through the channel attention module and the spatial attention module in turn;
an output feature $Y_d$ of the Dropout layer in the residual block is as follows:

$$Y_d = \frac{1}{1-p} \times x,$$

wherein x is input of the Dropout layer, p is the dropout rate.

3. The fault detection method for refrigeration units based on an improved deep learning model according to claim 2, wherein a value of the dropout rate p is 0.2.

4. The fault detection method for refrigeration units based on an improved deep learning model according to claim 1, wherein the residual block comprises a first 1DCNN layer, an activation function layer, a BN layer, a second 1DCNN layer, the Dropout layer and an identity mapping layer sequentially connected; input of the first 1DCNN layer and the output of the Dropout layer are input to the identity mapping layer together for superposition.

5. The fault detection method for refrigeration units based on an improved deep learning model according to claim 1, wherein in the channel attention module, the output features of the hidden layer output by the ResNet module are subjected to global max pooling and global average pooling operations to obtain feature maps $F_{max}^c$ and $F_{avg}^c$, respectively; the feature maps $F_{max}^c$ and $F_{avg}^c$ are both input into a multilayer perceptron to generate feature map 1 and feature map 2, respectively; in multilayer perceptron, a channel dimension of the feature maps is reduced by using channel reduction; a value of a reduction ratio r for the channel reduction is a factor of a number of the operating parameters, and r>1; the feature map 1 and the feature map 2 are concatenated through elements to obtain a new feature map; the new feature map is activated by Sigmoid function and each of the elements in the new feature map is given a new weight, and the weight is the channel attention weight $M_C(F)$.

6. The fault detection method for refrigeration units based on an improved deep learning model according to claim 1, wherein a feature vector Y obtained by weighting weights of the CBAM module is input to the fully connected layer; weight parameters in the fully connected layer combine input features to generate a high-dimensional global feature Z; the weight parameters are learned and updated during a training process by a back-propagation algorithm; the global feature Z is input into output layer of the fully connected layer, the output layer uses a Softmax function, the output layer contains n neuron, wherein n is a number of states of the refrigeration unit, and n neurons are used to determine n−1 fault states and a normal state of the refrigeration unit.

7. The fault detection method for refrigeration units based on an improved deep learning model according to claim 1, wherein a specific process of S2 is as follows:

1) constructing an expression for a reachability distance reach_$d_k$(b, o) for any point b in the data set, by a processor:

$$\text{reach\_}d_k(b, o) = \max\{(d_k(o), d(b, o)\}, \quad (1)$$

wherein point o is any neighbor point of the point b, $d_k$(o) is a distance between the k-th neighbor point and the point o, and d(b, o) denotes Euclidean distance between the point b and the point o;

2) calculating a local reachability density $Ird_k$(b), by a processor, as follows:

$$Ird_k(b) = \frac{1}{\left(\frac{\sum_{o \in N_k(b)} \text{reach\_}d_k(b, o)}{|N_k(b)|}\right)}, \quad (2)$$

wherein $N_k$(b) is a set of the point b and K-th near neighbor data points;

3) calculating a local outlier factor $LOF_k$(b) of the point b, by a processor:

$$LOF_k(b) = \frac{\sum_{o \in N_k(b)} \frac{Ird_k(o)}{Ird_k(b)}}{|N_k(b)|}; \quad (3)$$

4) determining a number G of samples to be generated after removing the local outlier factor $LOF_k$(b) by a processor:

$$G = (m_l - m_s) * \beta, \quad (4)$$

wherein $m_l$ represents a number of existing majority samples, and ms represents a number of existing minority samples, $\beta \in [0,1]$;

5) calculating a ratio $r_i$ of the majority samples in the K-th near neighbor of each of the minority samples, by a processor:

$$ri = \Delta i/K, \quad (5)$$

wherein $\Delta i$ is the number of the samples belonging to the majority samples among the K-th near neighbor of the i-th minority sample;

6) calculating a standardized ratio $r_i^*$, by a processor, as follows:

$$r_i^* = r_i / \sum_{i=1}^{m_s} r_i, \quad (6)$$

7) calculating a number of new samples that need to be generated for each of the minority samples, by a processor:

$$g_i = r_i^* * G; \quad (7)$$

8) generating $g_i$ new samples for each of the minority samples xi, by a processor:

$$s_i = x_i + (x_{zi} - x_i) * \gamma, \quad (8)$$

wherein si represents the newly generated samples, xzi is a minority sample randomly selected from the k-th neighbor of the minority samples xi, and $\gamma \in [0,1]$ is a random number.

8. A computer device, comprising a memory, a processor and a computer program stored in the memory and runnable on the processor, wherein the memory stores the computer program, and the processor executes the fault detection method for refrigeration units based on an improved deep learning model as claimed in claim 1.

* * * * *